(12) United States Patent
Ferber (10) Patent No.: US 8,164,977 B2
(45) Date of Patent: Apr. 24, 2012

(54) SIMULATING UP-GOING PRESSURE WAVEFIELD

(75) Inventor: Ralf G. Ferber, Horsham (GB)

(73) Assignee: WesternGeco L.L.C., Houston, TX (US)

( * ) Notice: Subject to any disclaimer, the term of this patent is extended or adjusted under 35 U.S.C. 154(b) by 554 days.

(21) Appl. No.: 12/331,634

(22) Filed: Dec. 10, 2008

(65) Prior Publication Data
US 2010/0142318 A1 Jun. 10, 2010

(51) Int. Cl.
*G01V 1/38* (2006.01)
*G01V 1/28* (2006.01)
(52) U.S. Cl. ............... 367/20; 367/21; 367/73
(58) Field of Classification Search ........... 367/20, 367/21, 24, 73
See application file for complete search history.

(56) References Cited

U.S. PATENT DOCUMENTS

| | | | |
|---|---|---|---|
| 6,775,618 B1 | 8/2004 | Robertsson et al. | |
| 7,379,385 B2 | 5/2008 | Ferber | |
| 2008/0025147 A1* | 1/2008 | Ferber | 367/24 |
| 2008/0165618 A1* | 7/2008 | Robertsson | 367/24 |
| 2008/0228402 A1 | 9/2008 | Ferber | |
| 2008/0275649 A1 | 11/2008 | Ozdemir et al. | |

OTHER PUBLICATIONS

Singh. Et al. "Broadband receiver response from dual-streamer data and applications in deep reflection seismology", Geophysics, vol. 61, No. 1, pp. 232-243 (Jan. 1996).*
PCT Search Report, dated Jul. 26, 2010, Application No. PCT/US2009/067310.
Lasse Amundsen, Wavenumber-Based Filterig of Marine Point-Source Data, Geophysics, Sep. 1993, pp. 1335-1348, vol. 58, No. 9.
B. J. Posthumus, Deghosting using a Twin Streamer Configuration, Geophysical Prospecting, 1993, pp. 267-286, vol. 41.

* cited by examiner

*Primary Examiner* — Eric Bolda (57) ABSTRACT

Various methods for simulating up-going pressure wavefield data. In one implementation, a processing apparatus may receive pressure data from pressure sensors that may be installed on a first and second streamer of an over/under streamer pair. The processing apparatus may also receive velocity data from velocity sensors that may be installed on the second streamer of the over/under streamer pair. Using the pressure and velocity data obtained from the sensors installed on each streamer, the processing apparatus may simulate the pressure and velocity data that would have been obtained by a streamer in a calm sea at a depth equal to the vertical distance between the first and second streamers. The simulated pressure and velocity data may then be combined to estimate the up-going pressure wavefield data.

20 Claims, 9 Drawing Sheets

FIGURE 3A - PRESSURE AT 15m DEPTH

FIGURE 3B - VELOCITY AT 7.5m DEPTH

FIGURE 3C - PRESSURE AT 22.5m DEPTH

FIGURE 3

FIGURE 4A - PRESSURE AT 7.5m DEPTH

FIGURE 4B - VELOCITY AT 7.5m DEPTH

SIMULATING UP-GOING PRESSURE WAVEFIELD

BACKGROUND

1. Field of the Invention

Implementations of various technologies described herein generally relate to seismic data processing, and more particularly, simulating up-going pressure wavefield data using pressure and particle velocity data acquired from over/under streamers.

2. Description of the Related Art

The following descriptions and examples are not admitted to be prior art by virtue of their inclusion within this section.

Seismic exploration is widely used to locate and/or survey subterranean geological formations for hydrocarbon deposits. Since many commercially valuable hydrocarbon deposits are located beneath bodies of water, various types of marine seismic surveys have been developed. In a typical marine seismic survey, seismic streamers are towed behind a survey vessel. The seismic streamers may be several thousand meters long and contain a large number of sensors, such as hydrophones, geophones, and associated electronic equipment, which are distributed along the length of the seismic streamer cable. The survey vessel may also include one or more seismic sources, such as air guns and the like.

As the seismic streamers are towed behind the survey vessel, acoustic signals, commonly referred to as "shots," produced by the one or more seismic sources are directed down through the water into strata beneath the water bottom, where they are reflected from the various subterranean geological formations. Reflected signals are received by the sensors, digitized, and then transmitted to the survey vessel. The digitized signals are referred to as "traces" and are recorded and at least partially processed by a signal processing unit deployed on the survey vessel. The ultimate aim of this process is to build up a representation of the subterranean geological formations beneath the streamers. Analysis of the representation may indicate probable locations of hydrocarbon deposits in the subterranean geological formations.

The seismic streamers may be in an over/under configuration, i.e., one set of streamers being suspended above another set of streamers. Streamers in an over/under configuration may be towed much deeper than streamers in a conventional single configuration.

Conventional techniques for simulating the up-going pressure wavefield data acquired by streamers in a twin over/under configuration generally involve a linear combination of pressure and particle velocity data. The linear combination may be deemed to be sufficient to create the up-going pressure wavefield free of sea-surface perturbations with an optimum overall signal-to-noise ratio, when the signal-to-noise ratio of the pressure data is significantly similar to that of the particle velocity data. If the signal-to-noise ratio of the pressure data differs significantly from that of the particle velocity data, the resulting up-going wavefield data may consist of an up-going wavefield without sea-surface perturbations but with a sub-optimum signal-to-noise ratio, or it may include an up-going wavefield with sea-surface perturbations but with an optimized the signal-to-noise ratio.

SUMMARY

Described herein are implementations of various technologies for simulating an up-going pressure wavefield from data recorded by two streamers in an over/under configuration.

In one implementation, a processing apparatus may receive pressure data from pressure sensors that may be installed on a first and second streamer of an over/under streamer pair. The processing apparatus may also receive velocity data from velocity sensors that may be installed on the first streamer of the over/under streamer pair. Using the pressure and velocity data obtained from the sensors installed on each streamer, the processing apparatus may simulate the pressure and velocity data that would have been obtained by a streamer in a calm sea at a depth equal to the vertical distance between the first and second streamers. The simulated pressure and velocity data may then be combined to estimate the up-going pressure wavefield data.

In one implementation, a processing apparatus may receive pressure data from pressure sensors that may be installed on a first and second streamer of an over/under streamer pair. The processing apparatus may also receive velocity data from velocity sensors that may be installed on the second streamer of the over/under streamer pair. Using the pressure and velocity data obtained from the sensors installed on each streamer, the processing apparatus may simulate the pressure and velocity data that would have been obtained by a streamer in a calm sea at a depth equal to the vertical distance between the first and second streamers. The simulated pressure and velocity data may then be combined to estimate the up-going pressure wavefield data.

In another implementation, a processing apparatus may receive pressure data from pressure sensors that may be installed on a first and second streamer of an over/under streamer pair. The processing apparatus may also receive velocity data from velocity sensors that may be installed on the first and second streamer of the over/under streamer pair. Using the pressure and velocity data obtained from the sensors installed on each streamer, the processing apparatus may simulate the pressure and velocity data that would have been obtained by a streamer in a calm sea at a depth equal to the vertical distance between the first and second streamers. The simulated pressure and velocity data may then be combined to estimate the up-going pressure wavefield data.

In another implementation, a processing apparatus may receive velocity data from velocity sensors that may be installed on a first and second streamer of an over/under streamer pair. The processing apparatus may also receive pressure data from pressure sensors that may be installed on the second streamer of the over/under streamer pair. Using the pressure and velocity data obtained from the sensors installed on each streamer, the processing apparatus may simulate the pressure and velocity data that would have been obtained by a streamer in a calm sea at a depth equal to the vertical distance between the first and second streamers. The simulated pressure and velocity data may then be combined to estimate the up-going pressure wavefield data.

In another implementation, a processing apparatus may receive velocity data from velocity sensors that may be installed on a first and second streamer of an over/under streamer pair. The processing apparatus may also receive pressure data from pressure sensors that may be installed on the first streamer of the over/under streamer pair. Using the pressure and velocity data obtained from the sensors installed on each streamer, the processing apparatus may simulate the pressure and velocity data that would have been obtained by a streamer in a calm sea at a depth equal to the vertical distance between the first and second streamers. The simulated pressure and velocity data may then be combined to estimate the up-going pressure wavefield data.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraphs provide a brief description of one or more implementations of various technologies and techniques directed at simulating the up-going pressure wavefield. Conventional techniques for simulating the up-going pressure wavefield generally involve a linear combination of pressure and vertical particle velocity data obtained from two sensors that may be installed on a streamer. The resulting up-going pressure wavefield data may be free of sea-surface perturbations and comprise of an optimum overall signal-to-noise ration only if the signal-to-noise ratio of the pressure data is similar to that of the particle velocity data. Accordingly, described herein are implementations of various technologies for simulating the up-going pressure wavefield free of sea-surface perturbations with an optimum overall signal-to-noise ratio without depending on the signal-to-noise ratio of the pressure or the particle velocity data.

In one implementation, twin over/under streamers may be configured such that one of the twin streamers may contain a dual sensor that may measure the vertical component of the particle velocity and the pressure of the ocean area surrounding that particular streamer. The other streamer may have one sensor that may measure the pressure of the ocean area surrounding that particular streamer. The data measured by the pressure and particle velocity sensors may contain sea-surface perturbations embedded within the data due to the rough-surface characteristics of the sea.

In one implementation, the measured pressure data obtained from the streamers' pressure sensors may be used as inputs into a shift and subtract algorithm to generate a simulated pressure data set at a depth corresponding to the difference in the depth between the twin streamers.

The measured pressure and vertical component of the particle velocity data from opposite streamers may be used as inputs into a shift, filter, and subtract algorithm to generate a simulated vertical component of the particle velocity data set at a depth corresponding to the difference in the depth between the twin streamers. The simulated pressure and vertical component of the particle velocity data may be free of sea-surface perturbations but it may not have an optimum signal-to-noise ratio because they may include combined additive noise features of the ocean recorded from the streamer's pressure and particle velocity sensors. The additive noise components may include a filtered mixture of the noise recorded from each sensor.

In order to determine an up-going pressure wavefield free of sea-surface perturbations with an optimum signal-to-noise ratio, the simulated pressure and particle velocity data may be combined using a combination algorithm. The combination algorithm may be used to deghost or remove some of the combined additive noise feature to create an up-going pressure wavefield with an optimum overall signal-to-noise ratio. The combination algorithm may subtract a scaled version of the simulated particle velocity data from the simulated pressure data to remove some of the additive noise features of the simulated data. The combination algorithm may then yield the up-going pressure wavefield free of sea-surface perturbations with an optimum signal-to-noise ratio.

One or more implementations of various techniques for simulating up-going pressure wavefield will now be described in more detail with reference to FIGS. 1-5 in the following paragraphs.

FIGS. 1A-1E illustrate schematic diagrams of a marine seismic survey 100 in accordance with implementations of various techniques described herein. Each figure in FIGS. 1A-1E describe an alternate implementation of the sensors that may be employed by the marine seismic survey 100. In one implementation, the marine seismic survey 100 may include a source array 1 configured to emit seismic energy. Although only one source array 1 is illustrated in FIGS. 1A-1E, it should be understood that more than one source array may be used in implementations of various techniques described herein.

The marine seismic survey 100 may further include a first streamer 11 and a second streamer 12, which are suspended within a water column at different depths below the surface of the sea 6. The surface of the sea 6 may contain sea-surface perturbations due to forces acting on the ocean which may create fluctuations in the sea level at any given time. The second streamer 12 may be suspended below the first streamer 11, but ocean tides and currents may prevent the second streamer 12 from being exactly vertically below the first streamer 11. The streamers may be deployed such that the first streamer 11 is deployed at a nominal depth $Z_1$ below the surface of the sea 6, the second streamer 12 is deployed at a nominal depth $Z_2$ below the surface of the sea 6, where $Z_2 > Z_1$. Ocean tides, currents, and the effect of surface waves may cause the separation between the streamers to vary from the intended value, e.g., $Z_2 - Z_1$. This arrangement may be referred to as an over/under combination of the streamers. The term "over" is typically associated with the shallower streamers, e.g., the first streamer 11, and the term "under" is typically associated with the deeper streamers, e.g., the second streamer 12. The streamers may be suspended from one or more floats 8 so that all the pressure sensors of one streamer may be at substantially the same depth in a flat sea.

The difference in depth between the first streamer 11 and second streamer 12 is indicated by nominal depth $Z_3$. Although only two streamers are shown on FIGS. 1A-1E, it should be understood that more than two over/under streamers may be used in implementations of various techniques described herein. In addition, it should further be understood that in some implementations, multi vertical over/under sources may be used in lieu of or in combination with multi over/under streamers.

A plurality of sensors may be disposed along each streamer. In one implementation (FIG. 1A), the first streamer 11 may contain a velocity sensor VS which may be configured to measure the vertical component of the particle velocity of the ocean area at the nominal depth $Z_1$. The first streamer 11 may also contain another sensor PS to measure the pressure of the ocean area at the nominal depth $Z_1$. The second streamer 12 may have a pressure sensor PS' to measure the pressure at the nominal depth $Z_2$. In one implementation, the first streamer 11 may use a dual sensor to measure the vertical component of the particle velocity and the pressure. Although the first streamer 11 has been described as having two sensors while the second streamer 12 has a pressure sensor installed thereon, it should be noted that technologies and techniques described herein may not be limited to this arrangement; instead, the sensors may be installed on either streamer in a variety of different arrangements as described in FIGS. 1B-1E. Additionally, it should be noted that other types of receivers or sensors, e.g., accelerometers, may be installed on either streamers.

In another implementation (FIG. 1B), the first streamer 11 may contain a pressure sensor PS which may be configured to measure the pressure of the ocean area at the nominal depth $Z_1$. The second streamer 12 may have a pressure sensor PS' to measure the pressure at the nominal depth $Z_2$. The second streamer 12 may also contain a velocity sensor VS' to measure the vertical component of the particle velocity of the ocean area at the nominal depth $Z_2$. In one implementation, the second streamer 12 may use a dual sensor to measure the vertical component of the particle velocity and the pressure.

In another implementation (FIG. 1C), the first streamer 11 may contain a velocity sensor VS which may be configured to measure the vertical component of the particle velocity of the ocean area at the nominal depth $Z_1$. The first streamer 11 may also contain another sensor PS to measure the pressure of the ocean area at the nominal depth $Z_1$. The second streamer 12 may have a pressure sensor PS' to measure the pressure at the nominal depth $Z_2$, and it may also have a velocity sensor VS' to measure the vertical component of the particle velocity at the nominal depth $Z_2$. In one implementation, the first streamer 11 and second streamer 12 may use dual sensors to measure the vertical component of the particle velocity and the pressure.

In another implementation (FIG. 1D), the first streamer 11 may contain a velocity sensor VS which may be configured to measure the vertical component of the particle velocity of the ocean area at the nominal depth $Z_1$. The second streamer 12 may have a pressure sensor PS' to measure the pressure at the nominal depth $Z_2$. The second streamer 12 may also contain another sensor VS' to measure the vertical component of the particle velocity of the ocean area at the nominal depth $Z_2$. In one implementation, the second streamer 12 may use a dual sensor to measure the vertical component of the particle velocity and the pressure.

In another implementation (FIG. 1E), the first streamer 11 may contain a velocity sensor VS which may be configured to measure the vertical component of the particle velocity of the ocean area at the nominal depth $Z_1$. The first streamer 11 may also contain another sensor PS to measure the pressure of the ocean area at the nominal depth $Z_1$. The second streamer 12 may have a velocity sensor VS' to measure the vertical component of the particle velocity at the nominal depth $Z_2$. In one implementation, the first streamer 11 may use a dual sensor to measure the vertical component of the particle velocity and the pressure.

The marine seismic survey 100 may further include a processing apparatus 20 for processing seismic data acquired by the pressure and the velocity sensors on the first streamers 11 and the second streamer 12 as a result of actuating the source array 1 to emit seismic energy. The processing apparatus 20 may be located, for example, on shore, on the towing vessel or on another vessel. Data acquired at the sensors on the streamers may be transmitted to a storage means, e.g., located on the towing vessel, by a communication means, e.g., an electrical, optical or wireless link, and may subsequently be passed to the processing apparatus 20. Alternatively, data acquired at the sensors may be stored for subsequent retrieval in storage means provided on the streamers. The processing apparatus 20 may be described in more detail with reference to FIG. 5.

The source array 1 may be an array of airguns or any other type of emitters, such as marine vibrator units and the like. Energy emitted from the source array 1 may be reflected by the seabed 3 or by other reflectors (not shown) below the seabed 3 and may then be detected by the pressure and the velocity sensors on the streamers 11 and 12.

The data obtained from the first streamer 11 and the second streamer 12 may be used by the processing apparatus 20 to simulate expected pressure and vertical component of the particle velocity data at a nominal (streamer depth difference) depth $Z_3$. The simulated data may represent the pressure and velocity data at a calm sea 7 without sea-surface perturbations. The simulated data may be considered to represent data that may have been obtained from the simulated pressure sensor PS" and the simulated velocity sensor VS" on the simulated streamer 13 at a nominal depth $Z_3$.

Figure 1A:
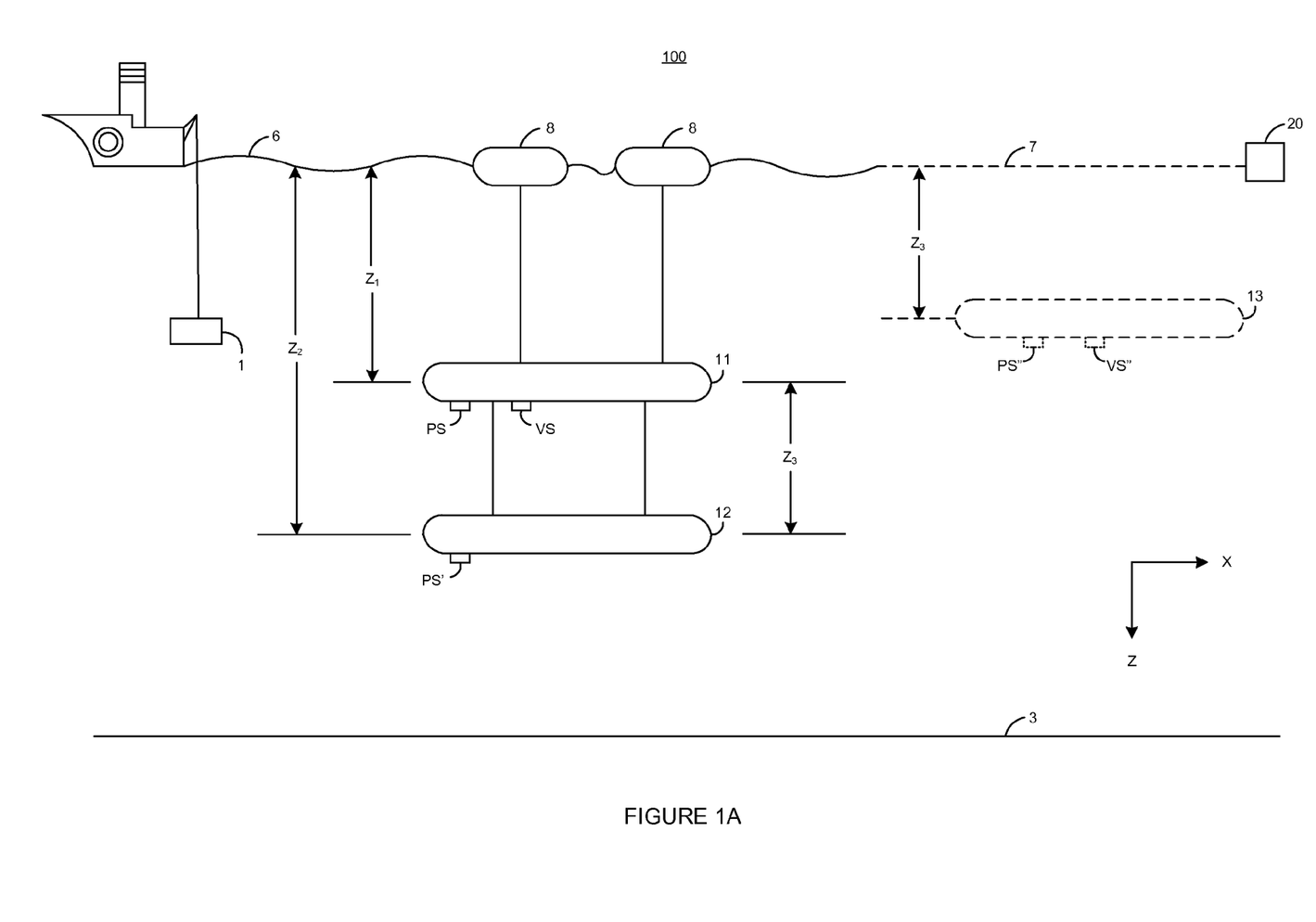
FIGS. 1A-1E illustrate schematic diagrams of a marine seismic survey in accordance with implementations of various techniques described herein.
Figure 1B:
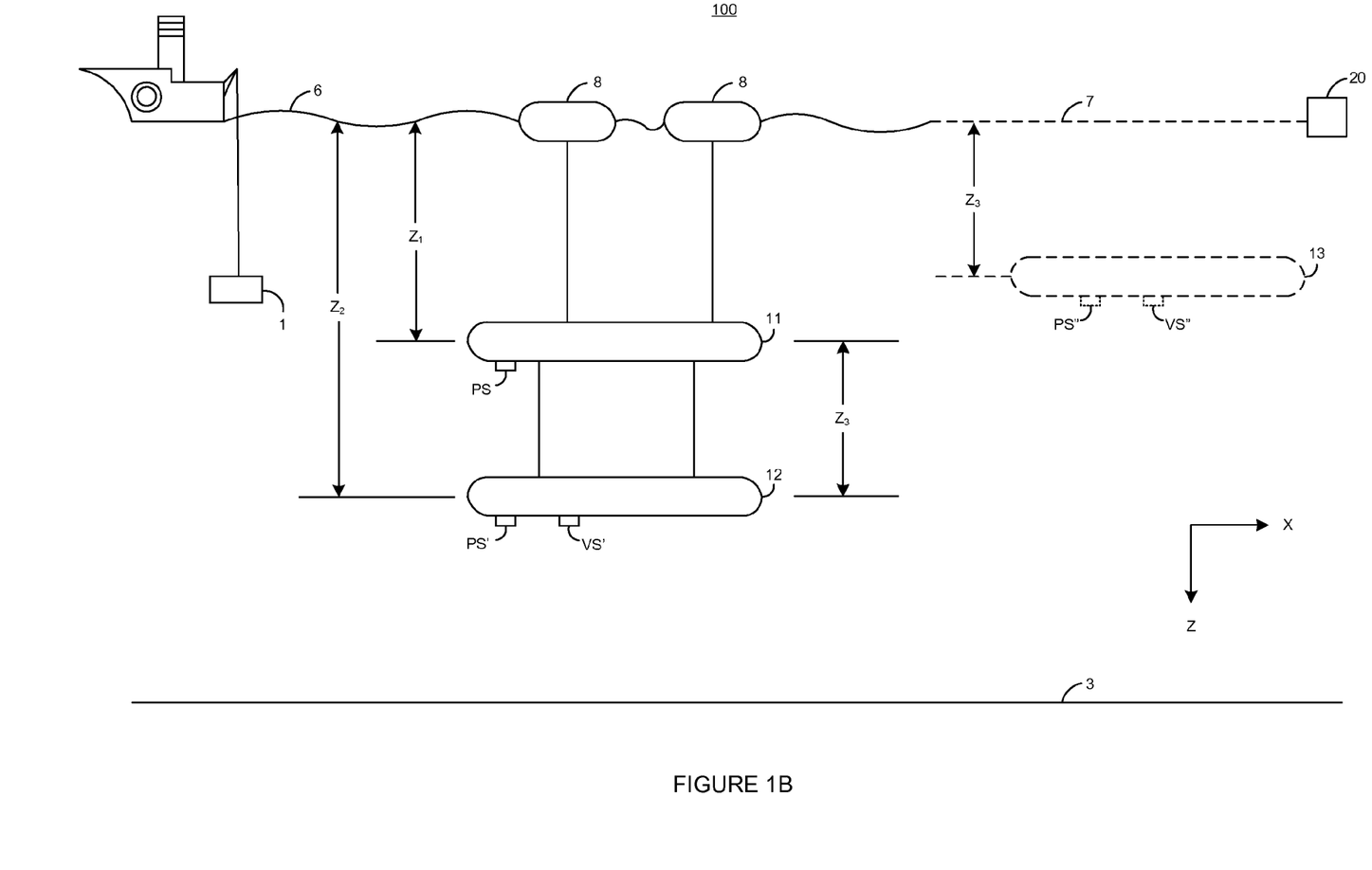
Figure 1C:
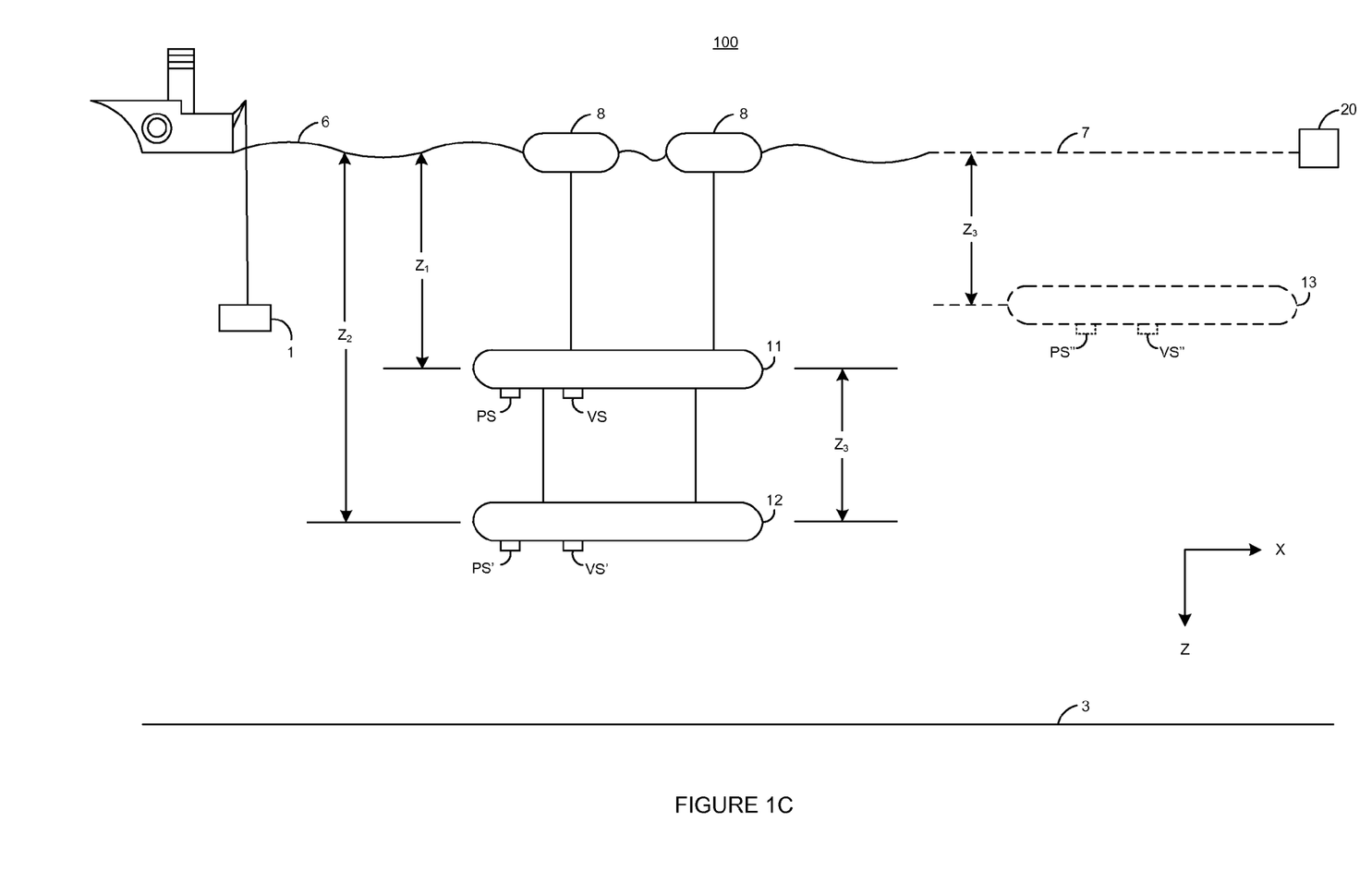
Figure 1D:
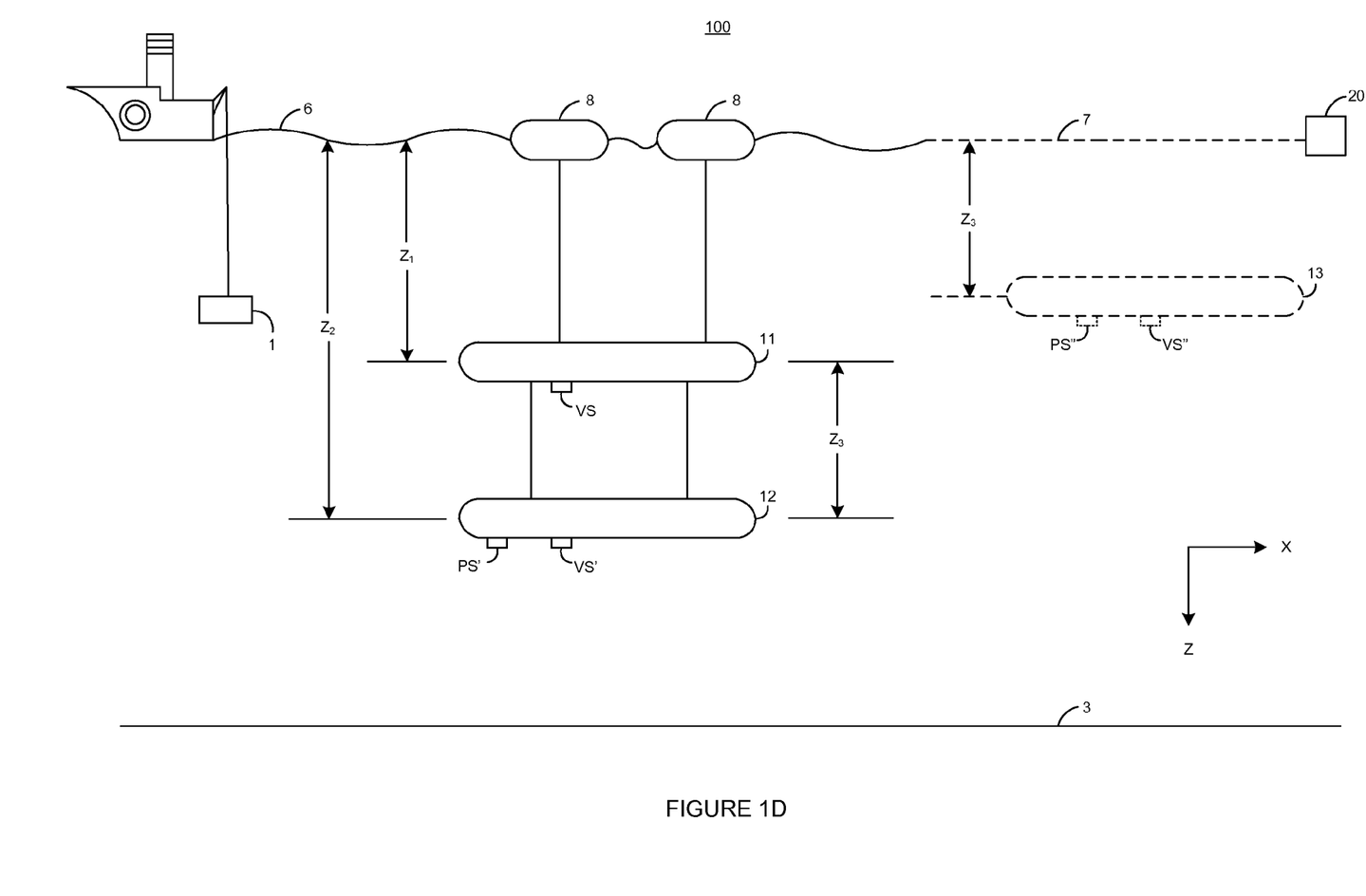
Figure 1E:
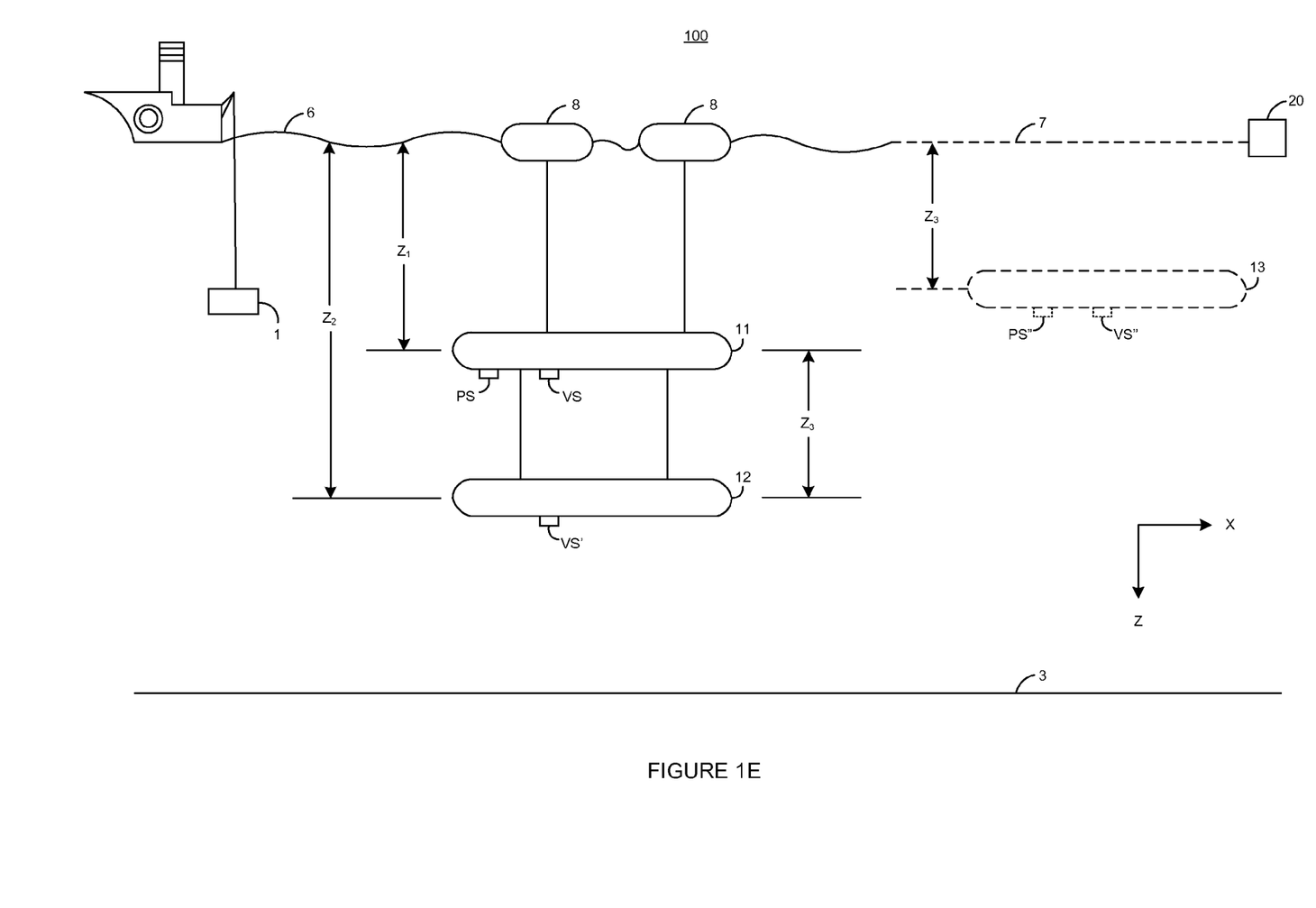
Figure 2:
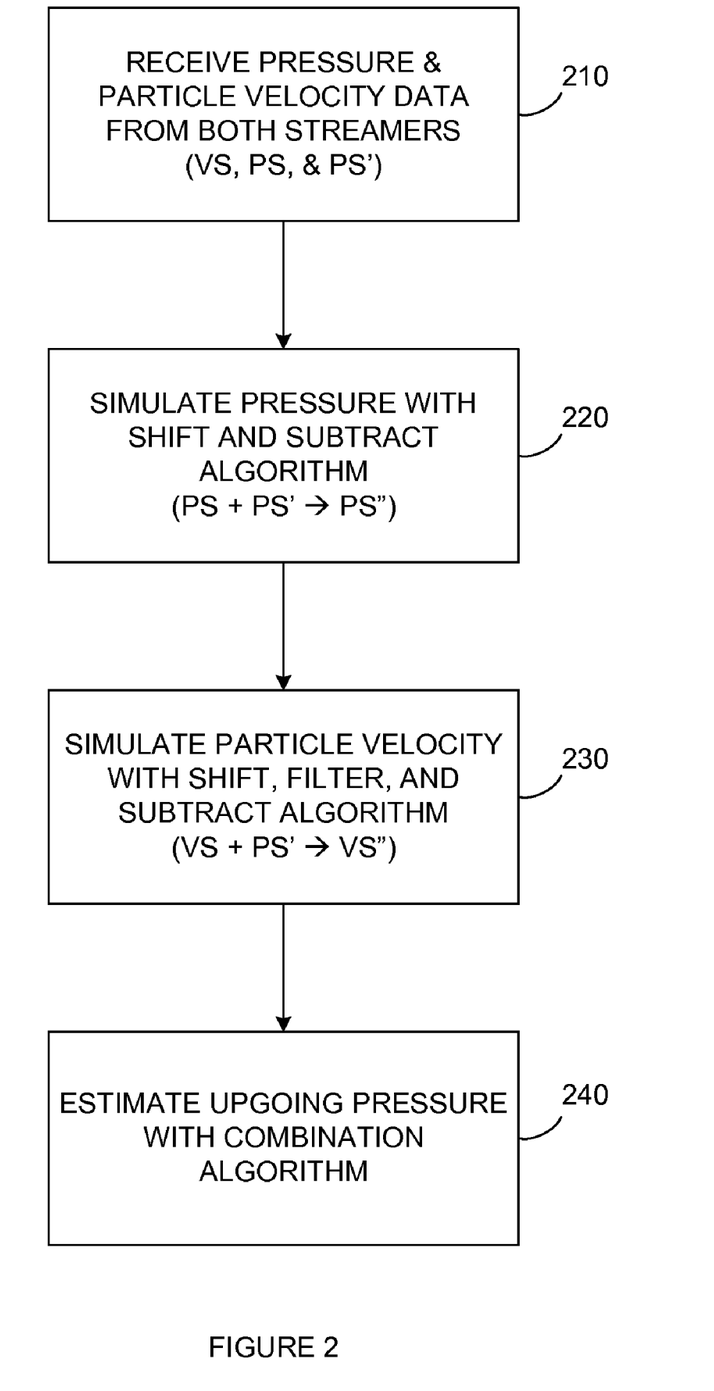
FIG. 2 illustrates a flow diagram of a method for simulating the up-going pressure wavefield data of a streamer at a specified depth in accordance with implementations of various techniques described herein.

FIG. 2 illustrates a flow diagram of a method 200 for simulating an up-going pressure wavefield at a nominal depth $Z_3$ in accordance with implementations of various techniques described herein. In one implementation, the seismic data such as pressure and velocity data may be acquired using a marine seismic survey having a twin over/under streamer configuration, such as the ones described in FIGS. 1A-1E. Although various implementations are described with reference to seismic data acquired using a twin over/under streamer configuration, it should be understood that in some implementations the seismic data may be acquired by an over/under streamer configuration having more than two streamers at various depths.

At step 210, the processing apparatus 20 may receive pressure data from the pressure sensor PS located on the first streamer 11 and from the pressure sensor PS' located on the second streamer 12. It may also receive the vertical component of the particle velocity data from the velocity sensor VS located on the first streamer 11. In one implementation, $P(z_1, \omega, k_x, k_y)$ and $V_z(z_1, \omega, k_x, k_y)$ may denote the pressure from the pressure sensor PS and the vertical component of the particle velocity from the velocity sensor VS on the first streamer 11 towed at the nominal depth $Z_1$, while $P(z_2, \omega, k_x, k_y)$ may denote the pressure recorded at a deeper depth or at the nominal depth $Z_2$. The data obtained from the pressure sensor PS and PS' and the velocity sensor VS may contain rough sea-surface perturbations and further additive noise components such that the pressure and the vertical component of the particle velocity may be described by:

$$P(z,\omega,k_x,k_y) = \tilde{P}(z,\omega,k_x,k_y) + N_P(z,\omega,k_x,k_y)$$

and $$V(z,\omega,k_x,k_y) = \tilde{V}(z,\omega,k_x,k_y) + N_V(z,\omega,k_x,k_y)$$

$\tilde{P}(z,\omega,k_x,k_y)$ denotes the noise free pressure data including sea-surface perturbations, if any. $N_P(z,\omega,k_x,k_y)$ denotes the related noise component of the pressure data. Correspondingly, $\tilde{V}_z(z,\omega,k_x,k_y)$ denotes the noise free particle velocity data including sea-surface perturbations, with $N_V(z,\omega,k_x,k_y)$ denoting the related noise component of the vertical component of the particle velocity data. The quantities $k_x, k_y$ denote the horizontal wave numbers, z denotes the depth at which the data was obtained from, and $\omega$ denotes the angular frequency.

At step 220, the processing apparatus 20 may apply a shift and subtract algorithm to the pressure data obtained from the pressure sensor PS and the pressure data obtained from the pressure sensor PS'. The shift and subtract algorithm may yield a simulated pressure data without sea-surface perturbations at the nominal depth $Z_3$ such that the simulated pressure data may be defined as:

$$\overline{P}(z_2-z_1,\omega,k_x,k_y) = e^{ik_z z_1} P(z_2,\omega,k_x,k_y) - e^{ik_z z_2} P(z_1,\omega,k_x,k_z) \quad \text{Equation 1}$$

and it may add a combined individual noise component such that:

$$\overline{P}(z_1,\omega,k_x,k_y) = e^{ik_z z_1} \tilde{P}(z_2,\omega,k_x,k_y) - e^{ik_z z_2} \tilde{P}(z_1,\omega,k_x,k_z) + \overline{N}_P(z_2-z_1,\omega,k_x,k_y)$$

$\overline{P}(z_2-z_1,\omega,k_x,k_y)$ denotes the simulated pressure data without sea-surface perturbations at the nominal depth $Z_3$. $\overline{N}_P(z_2-z_1,\omega,k_x,k_y)$ denotes the combined additive noise component of the pressure data obtained from the pressure sensors PS and PS'. The additive noise components may include a filtered mixture of the noise recorded from each streamer's pressure sensors (e.g., PS and PS'). e denotes the complex exponential function.

At step 230, the processing apparatus 20 may apply a shift, filter, and subtract algorithm to the vertical component of the particle velocity data obtained from the velocity sensor VS and the pressure data obtained from the pressure sensor PS'. The shift, filter, and subtract algorithm may yield a simulated vertical component of the particle velocity VS" without sea-surface perturbations at the nominal depth $Z_3$. The simulated vertical component of the particle velocity VS" may include a less than optimal signal-to-noise ratio due to the additive noise components contained in the vertical component of the particle velocity data obtained from the velocity sensor VS and the pressure data obtained from the pressure sensor PS'. The additive noise features may include a filtered mixture of the noise in the actual recordings from the velocity sensor VS and the pressure sensor PS'.

Typically, the simulated vertical component of the particle velocity VS" may not be determined without at least two particle velocity sensors. The shift, filter, and subtract algorithm, however, may enable a user to simulate the vertical component of the particle velocity with the data obtained from a pressure sensor and a particle velocity sensor located on two different streamers. The simulated vertical component of the particle velocity may be defined as:

$$\overline{V}_z(z_2-z_1,\omega,k_x,k_y) = \quad \text{Equation 2}$$

$$e^{ik_z z_2} V_z(z_1,\omega,k_x,k_z) - e^{ik_z z_1} \frac{k_z}{\rho\omega} P(z_2,\omega,k_x,k_y)$$

$\overline{V}_z(z_2-z_1,\omega,k_x,k_y)$ denotes the simulated vertical component of the particle velocity VS". $k_z$ denotes the vertical wave number and is defined by:

$$k_z = \sqrt{\left(\frac{\omega}{\alpha}\right)^2 - k_x^2 - k_y^2},$$

with $\alpha$ denoting the water-velocity in meters per second. $\rho$ denotes the density of the water surrounding the streamers.

At step 240, the processing apparatus 20 may estimate the up-going pressure wavefield at the nominal depth $Z_3$ using a conventional pressure and particle velocity combination algorithm such that the up-going pressure wavefield data may be defined as:

$$\overline{P}_u(z_2-z_1,\omega,k_x,k_y) = \quad \text{Equation 3}$$

$$\frac{1}{2}\left(\overline{P}(z_2-z_1,\omega,k_x,k_y) - \frac{\rho\omega}{k_z}\overline{V}_z(z_2-z_1,\omega,k_x,k_y)\right)$$

$\overline{P}_u(z_2-z_1,\omega,k_x,k_y)$ denotes the simulated up-going pressure wavefield at the nominal depth $Z_3$. The combination algorithm may combine the simulated pressure data PS" with the simulated vertical component of the particle velocity VS" to create the simulated up-going pressure wavefield.

The combination algorithm may optimize the signal-to-noise ration of the simulated up-going pressure wavefield by removing some of the additive noise features contained in the simulated pressure data PS" and the simulated vertical component of the particle velocity VS". The combination algorithm may subtract a scaled version of the simulated vertical component of the particle velocity data from the simulated pressure data to remove some of the additive noise features. In one implementation, step 240 may be performed using the combination algorithm described in commonly assigned U.S. patent application Ser. No. 11/740,641, entitled Method For Optimal Wavefield Separation, which involves a weighted summation of the simulated pressure and particle motion data, where the weights depend on the signal-to-noise ratio of the simulated data. This algorithm may be used to produce the up-going pressure wave with an optimum signal-to-noise ratio.

FIGS. 3-4 illustrate examples of received and simulated pressure and particle velocity data at various depths in accordance with various implementations described herein. FIG. 3 illustrates recorded pressure and vertical particle velocity data from a twin over/under streamer configuration, with the first streamer 11 at a depth of 15 meters and the second streamer 12 at a depth of 22.5 meters. The recorded pressure data have been grouped according to their respective streamer depth from which they are acquired. For purposes of illustration, the recorded pressure and vertical particle velocity data include sea-surface perturbations.

Figure 3A:
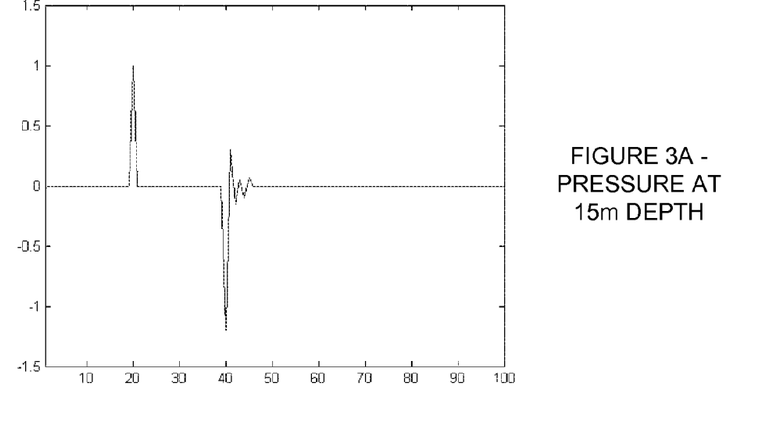
FIGS. 3-4 illustrate an example of simulating the pressure and particle velocity in accordance with various implementations described herein.

FIG. 3A illustrates the pressure data received from the pressure sensor PS on the first streamer 11 at a depth of 15 meters. For purposes of illustration, the pressure data displayed in FIG. 3A includes sea-surface perturbations.

Figure 3B:
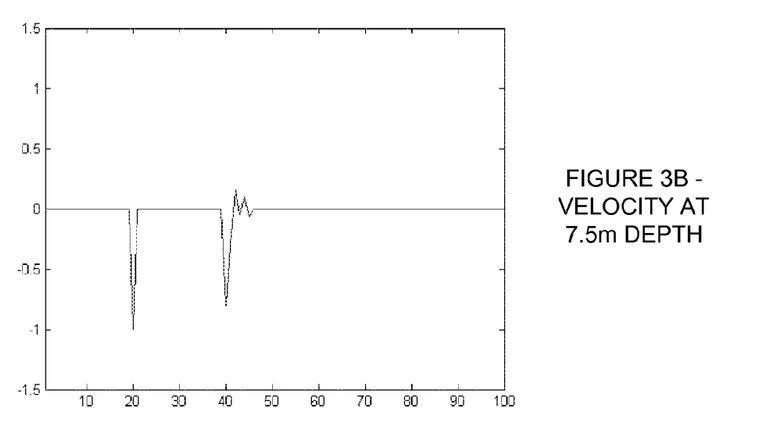

FIG. 3B illustrates the vertical component of the particle velocity data received from the velocity sensor VS on the first streamer 11 at a depth of 15 meters. For purposes of illustration, the velocity data displayed in FIG. 3B includes sea-surface perturbations.

Figure 3C:
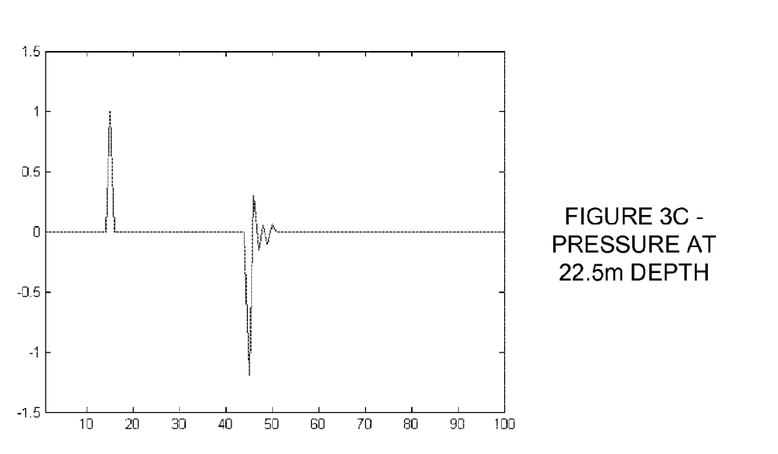

FIG. 3C illustrates the pressure data received from the pressure sensor PS' on the second streamer 12 at a depth of 22.5 meters. For purposes of illustration, the pressure data displayed in FIG. 3C includes sea-surface perturbations.

Figure 4A:
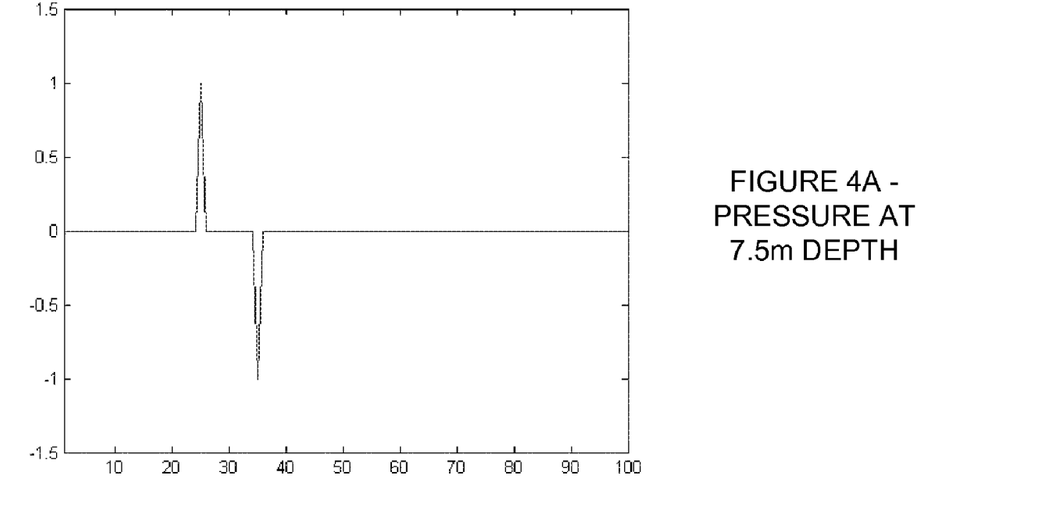
Figure 4B:
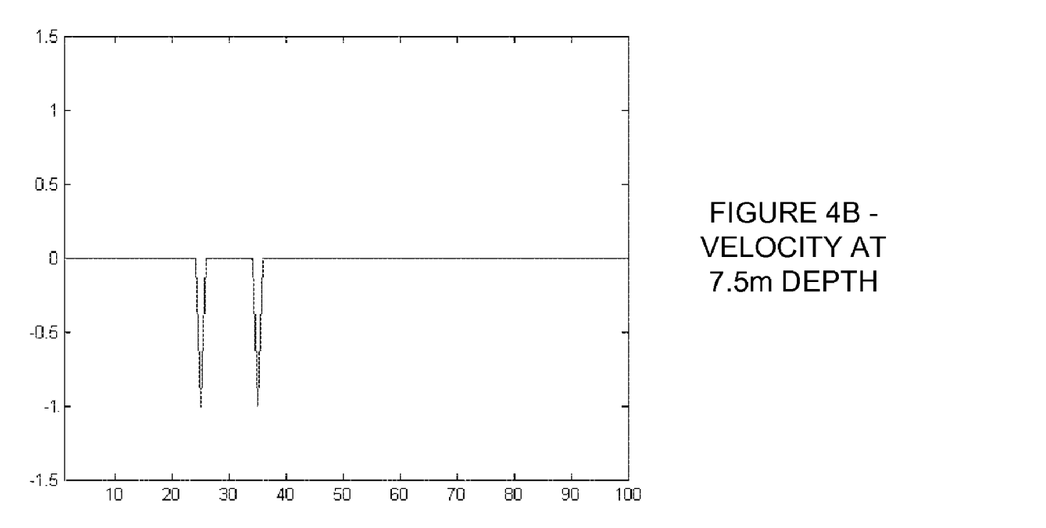

FIGS. 4A and 4B illustrates the simulated pressure and velocity data at a depth equal to the vertical separation between the first streamer 11 and the second streamer 12. FIG. 4A illustrates the output of the shift and subtract algorithm (Equation 1) as applied to the pressure data illustrated in FIG. 3A and FIG. 3C. The output of the shift and subtract algorithm in FIG. 4A may represent the simulated pressure obtained from the simulated pressure sensor PS" on the simulated streamer 13 at a depth of 7.5 meters, which is equal to the vertical separation between the first streamer 11 at a depth of 15 meters and the second streamer 12 at a depth of 22.5 meters. The shift and subtract algorithm may remove the sea-surface perturbations from the simulated pressure data such that the data may be considered to be obtained from the pressure sensor PS" in the calm sea 7.

FIG. 4B illustrates the output of the shift, filter, and subtract algorithm (Equation 2) as applied to the velocity data represented in FIG. 3b and the pressure data represented in FIG. 3C. The output of the shift, filter, and subtract algorithm may represent the simulated velocity obtained from the simulated velocity sensor VS" on the simulated streamer 13 at a depth of 7.5 meters, which is equal to the vertical separation between the first streamer 11 at a depth of 15 meters and the second streamer 12 at a depth of 22.5 meters. The shift, filter, and subtract algorithm may remove the sea-surface perturbations from the simulated velocity data such that the data may be considered to be obtained from the velocity sensor VS" in the calm sea 7.

Figure 5:
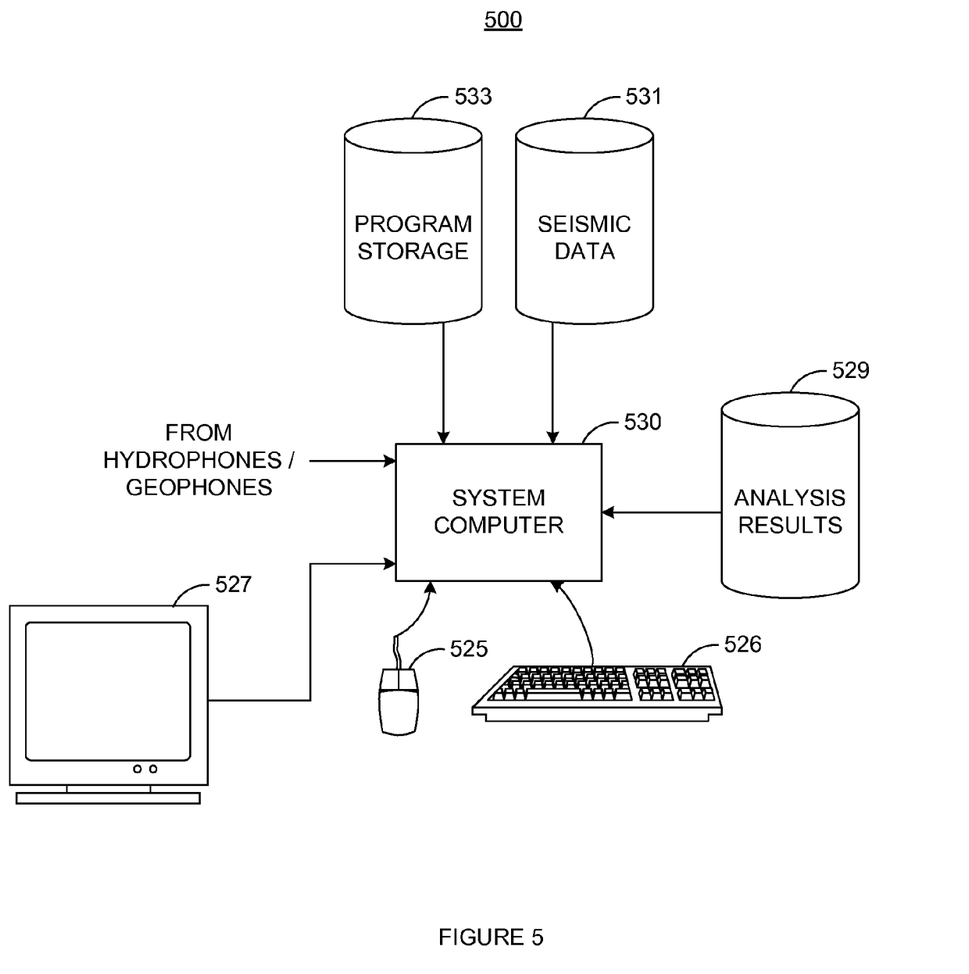
FIG. 5 illustrates a computer network into which implementations of various technologies described herein may be implemented.

FIG. 5 illustrates a computer network 500 into which implementations of various technologies described herein may be implemented. In one implementation, the processing apparatus 20 of FIGS. 1A-1E may comprise of the computer network 500 to simulate the up-going wavefield pressure data. The computer network 500 may include a system computer 530, which may be implemented as any conventional personal computer or server. However, it should be understood that implementations of various technologies described herein may be practiced in other computer system configurations, including hypertext transfer protocol (HTTP) servers, hand-held devices, multiprocessor systems, microprocessor-based or programmable consumer electronics, network PCs, minicomputers, mainframe computers, and the like.

The system computer 530 may be in communication with disk storage devices 529, 531, and 533, which may be external hard disk storage devices. It is contemplated that disk storage devices 529, 531, and 533 are conventional hard disk drives, and as such, will be implemented by way of a local area network or by remote access. Of course, while disk storage devices 529, 531, and 533 are illustrated as separate devices, a single disk storage device may be used to store any and all of the program instructions, measurement data, and results as desired.

In one implementation, seismic data from the receivers may be stored in disk storage device 531. The system computer 530 may retrieve the appropriate data from the disk storage device 531 to process seismic data according to program instructions that correspond to implementations of various technologies described herein. Seismic data may include pressure and particle velocity data. The program instructions may be written in a computer programming language, such as C++, Java and the like. The program instructions may be stored in a computer-readable memory, such as program disk storage device 533. Such computer-readable media may include computer storage media and communication media.

Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 500.

Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of the any of the above may also be included within the scope of computer readable media.

In one implementation, the system computer 530 may present output primarily onto graphics display 527. The system computer 530 may store the results of the methods described above on disk storage 529, for later use and further analysis. The keyboard 526 and the pointing device (e.g., a mouse, trackball, or the like) 525 may be provided with the system computer 530 to enable interactive operation.

The system computer 530 may be located at a data center remote from the survey region. The system computer 530 may be in communication with the receivers (either directly or via a recording unit, not shown), to receive signals indicative of the reflected seismic energy. After conventional formatting and other initial processing, these signals may be stored by the system computer 530 as digital data in the disk storage 531 for subsequent retrieval and processing in the manner described above. While FIG. 5 illustrates the disk storage 531 as directly connected to the system computer 530, it is also contemplated that the disk storage device 531 may be accessible through a local area network or by remote access. Furthermore, while disk storage devices 529, 531 are illustrated as separate devices for storing input seismic data and analysis results, the disk storage devices 529, 531 may be implemented within a single disk drive (either together with or separately from program disk storage device 533), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for simulating up-going pressure wavefield data, comprising:
   receiving pressure data from pressure sensors disposed on a first streamer and a second streamer of an over/under streamer pair;
   receiving velocity data from velocity sensors disposed on the second streamer;
   creating simulated pressure data that would have been acquired by a simulated single streamer disposed at a depth equal to a vertical distance between the first streamer and the second streamer and that would have been acquired in a calm sea having a flat surface, wherein the simulated pressure data is created based on the pressure data;
   creating simulated velocity data that would have been acquired by the simulated single streamer based on the pressure data from the pressure sensors disposed on the first streamer and the velocity data from the velocity sensors disposed on the second streamer; and
   combining the simulated pressure data with the simulated velocity data to estimate the up-going pressure wavefield data.

2. The method of claim 1, wherein the first streamer is disposed above the second streamer.

3. The method of claim 1, wherein the first streamer is disposed below the second streamer.

4. The method of claim 1, wherein the velocity data comprise vertical components of particle velocity data.

5. The method of claim 1, wherein creating the simulated pressure data comprises applying a shift and subtract algorithm to the pressure data from the pressure sensors disposed on the first streamer and the second streamer.

6. The method of claim 1, wherein creating the simulated velocity data comprises applying a shift, filter and subtract algorithm to the pressure data from the pressure sensors disposed on the first streamer and the velocity data from the velocity sensors disposed on the second streamer.

7. The method of claim 1, wherein pressure data and the velocity data acquired from the over/under streamer pair comprise rough sea perturbations.

8. The method of claim 1, wherein combining the simulated pressure data with the simulated velocity data comprises subtracting a scaled version of the simulated velocity data from the simulated pressure data.

9. A method for simulating up-going pressure wavefield data, comprising:
   receiving pressure data from pressure sensors disposed on a first streamer and a second streamer of an over/under streamer pair;
   receiving velocity data from velocity sensors disposed on the first streamer and the second streamer;
   creating simulated pressure data that would have been acquired by a simulated single streamer disposed at a depth equal to a vertical distance between the first streamer and the second streamer and that would have been acquired in a calm sea having a flat surface, wherein the simulated pressure data is created based on the pressure data;
   creating simulated velocity data that would have been acquired by the simulated single streamer based on the pressure data from the pressure sensors disposed on the second streamer and the velocity data from the velocity sensors disposed on the first streamer; and
   combining the simulated pressure data with the simulated velocity data to estimate the up-going pressure wavefield data.

10. The method of claim 9, wherein the first streamer is disposed above the second streamer.

11. The method of claim 9, wherein the velocity data comprise vertical components of particle velocity data.

12. The method of claim 9, wherein creating the simulated pressure data comprises applying a shift and subtract algorithm to the pressure data from the pressure sensors disposed on the first streamer and the second streamer.

13. The method of claim 9, wherein creating the simulated velocity data comprises applying a shift, filter and subtract algorithm to the pressure data from the pressure sensors disposed on the second streamer and the velocity data from the velocity sensors disposed on the first streamer.

14. The method of claim 9, wherein pressure data and the velocity data acquired from the over/under streamer pair comprise rough sea perturbations.

15. The method of claim 9, wherein combining the simulated pressure data with the simulated velocity data comprises subtracting a scaled version of the simulated velocity data from the simulated pressure data.

16. A method for simulating up-going pressure wavefield data, comprising:
   receiving velocity data from velocity sensors disposed on a first streamer and a second streamer of an over/under streamer pair;
   receiving pressure data from pressure sensors disposed on the second streamer;
   creating simulated pressure data that would have been acquired by a simulated single streamer disposed at a depth equal to a vertical distance between the first streamer and the second streamer and that would have been acquired in a calm sea having a flat surface, wherein the simulated pressure data is based on the pressure data from the pressure sensors disposed on the second streamer and the velocity data from the velocity sensors disposed on the first streamer;
   creating simulated velocity data that would have been acquired by the simulated single streamer based on the velocity data; and
   combining the simulated pressure data with the simulated velocity data to estimate the up-going pressure wavefield data.

17. The method of claim 16, wherein the first streamer is disposed above the second streamer.

18. The method of claim 16, wherein the first streamer is disposed below the second streamer.

19. The method of claim 16, wherein creating the simulated velocity data comprises applying a shift and subtract algorithm to the velocity data from the velocity sensors disposed on the first streamer and the second streamer.

20. The method of claim 16, wherein creating the simulated pressure data comprises applying a shift, filter and subtract algorithm to the pressure data from the pressure sensors disposed on the second streamer and the velocity data from the velocity sensors disposed on the first streamer.

* * * * *